United States Patent
Wang et al.

(10) Patent No.: US 9,846,579 B1
(45) Date of Patent: Dec. 19, 2017

(54) UNIFIED INTEGER AND FLOATING-POINT COMPARE CIRCUITRY

(71) Applicant: Apple Inc., Cupertino, CA (US)

(72) Inventors: Liang-Kai Wang, Austin, TX (US); Terence M. Potter, Austin, TX (US); Andrew M. Havlir, Orlando, FL (US)

(73) Assignee: Apple Inc., Cupertino, CA (US)

( * ) Notice: Subject to any disclaimer, the term of this patent is extended or adjusted under 35 U.S.C. 154(b) by 54 days.

(21) Appl. No.: 15/180,725

(22) Filed: Jun. 13, 2016

(51) Int. Cl.
  *G06F 7/02* (2006.01)
  *G06F 9/30* (2006.01)

(52) U.S. Cl.
  CPC ........ *G06F 9/30021* (2013.01); *G06F 9/3001* (2013.01); *G06F 9/30083* (2013.01)

(58) Field of Classification Search
  None
  See application file for complete search history.

(56) References Cited

U.S. PATENT DOCUMENTS

| | | | |
|---|---|---|---|
| 6,154,760 A | 11/2000 | Sharangpani | |
| 6,397,239 B2 | 5/2002 | Oberman et al. | |
| 2005/0125476 A1* | 6/2005 | Symes | G06F 9/30014 708/524 |
| 2006/0101242 A1* | 5/2006 | Siu | G06F 7/483 712/221 |
| 2006/0101243 A1* | 5/2006 | Siu | G06F 7/483 712/221 |
| 2006/0101244 A1 | 5/2006 | Siu et al. | |
| 2006/0149803 A1* | 7/2006 | Siu | G06F 9/30014 708/501 |
| 2011/0314263 A1 | 12/2011 | Greiner et al. | |

\* cited by examiner

*Primary Examiner* — David H Malzahn
(74) *Attorney, Agent, or Firm* — Meyertons, Hood, Kivlin, Kowert & Goetzel, P.C.

(57) ABSTRACT

Techniques are disclosed relating to comparison circuitry. In some embodiments, compare circuitry is configured to generate comparison results for sets of inputs in both one or more integer formats and one or more floating-point formats. In some embodiments, the compare circuitry includes padding circuitry configured to add one or more bits to each of first and second input values to generate first and second padded values. In some embodiments, the compare circuitry also includes integer subtraction circuitry configured to subtract the first padded value from the second padded value to generate a subtraction result. In some embodiments, the compare circuitry includes output logic configured to generate the comparison result based on the subtraction result. In various embodiments, using at least a portion of the same circuitry (e.g., the subtractor) for both integer and floating-point comparisons may reduce processor area.

20 Claims, 7 Drawing Sheets

US 9,846,579 B1

UNIFIED INTEGER AND FLOATING-POINT COMPARE CIRCUITRY

BACKGROUND

Technical Field

This disclosure relates generally to computing systems and more particularly to circuitry for comparing input values.

Description of the Related Art

Many computer programs involve comparison operations. For example, many conditional instructions specify to perform some operation (e.g., branch to a particular code segment) if one value A is greater than another value B. Compare operations are often implemented using an existing arithmetic execution unit. This may require more cycles for comparisons than would normally be needed (e.g., an execution configured to perform fused multiply-add operations may generate comparison results in a later stage than a dedicated compare unit could generate the results). Further, using an existing execution unit may consume considerable power. On the other hand, adding a separate compare unit may substantially increase chip area, especially in applications with a large number of parallel processing units, such as often the case in graphics processing, for example. For parallel processors that support both floating-point and integer operations, adding an integer comparator and a floating-point comparator for each parallel processing pipeline may result in an even greater proportional increase in chip area.

SUMMARY

Techniques are disclosed relating to comparison circuitry. In some embodiments, compare circuitry is configured to generate comparison results for sets of inputs in both one or more integer formats and one or more floating-point formats. For example, the compare circuitry may first compare integer inputs A and B based on a first instruction and later compare floating-point inputs C and D based on a second instruction. In some embodiments, the compare circuitry includes padding circuitry configured to add one or more bits to each of first and second input values to generate first and second padded values. The value of the padded bits may be based on the format of the input values. For floating-point inputs, the padded outputs may have sign bits replaced with zero. The padding may allow the same subtraction circuitry to be used for various different input formats.

In some embodiments, the compare circuitry also includes integer subtraction circuitry configured to subtract the first padded value from the second padded value to generate a subtraction result. The subtraction result may not be numerically accurate for floating-point formats but may still be usable to determine which input is greater. In some embodiments, the compare circuitry includes output logic configured to generate the comparison result based on the subtraction result. This may include floating-point logic configured to generate the comparison result based on a bit of the subtraction result and sign bits of the inputs. This may also include integer logic configured to generate the comparison result based on a sign bit of the subtraction result. The logic may also be configured to detect when the inputs are equal.

In various embodiments, using at least a portion of the same circuitry (e.g., the subtractor) for both integer and floating-point comparisons may reduce processor area. Further, using a dedicated comparison unit, in some embodiments, may reduce power consumption and/or increase efficiency relative to using a general-purpose integer or floating-point unit to perform comparisons.

Figure 2:
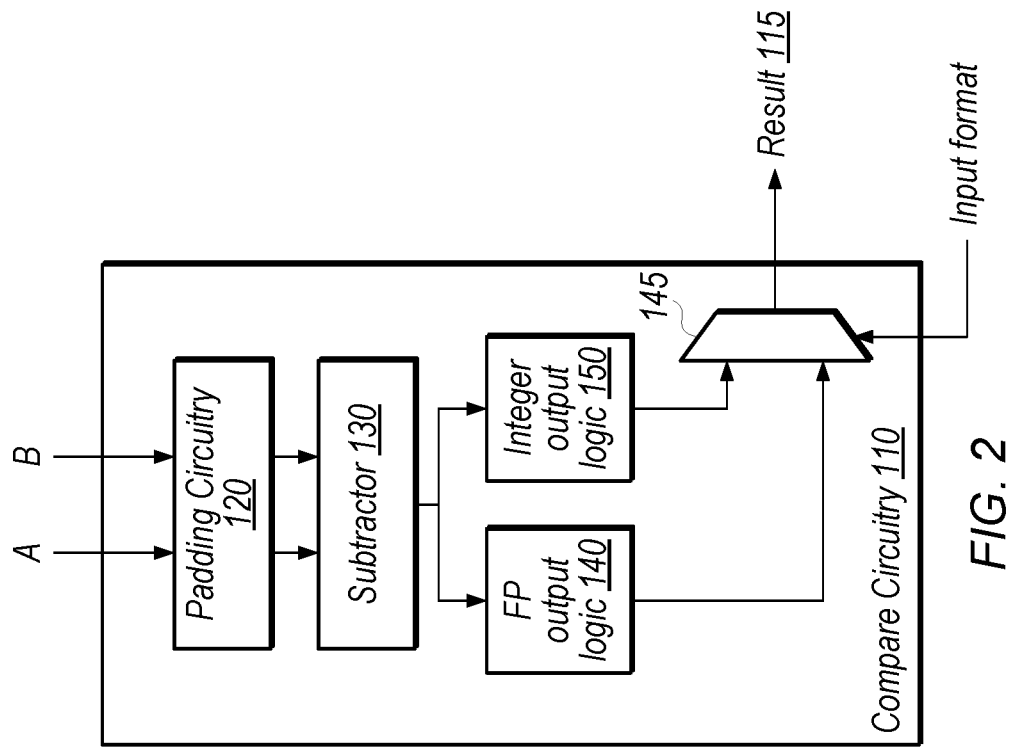
FIG. 2 is a more detailed block diagram illustrating exemplary compare circuitry, according to some embodiments.

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible.

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims that a structure is "configured to" perform one or more tasks is expressly intended not to invoke 35 U.S.C. §112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

DETAILED DESCRIPTION

Figure 1:
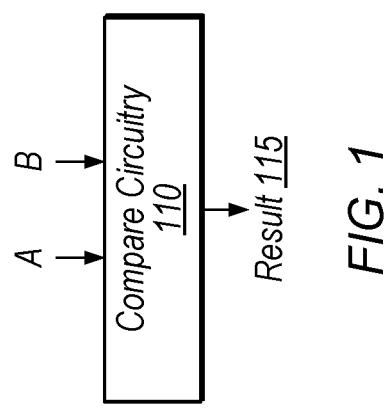
FIG. 1 is a block diagram illustrating exemplary compare circuitry, according to some embodiments.
Figure 3:
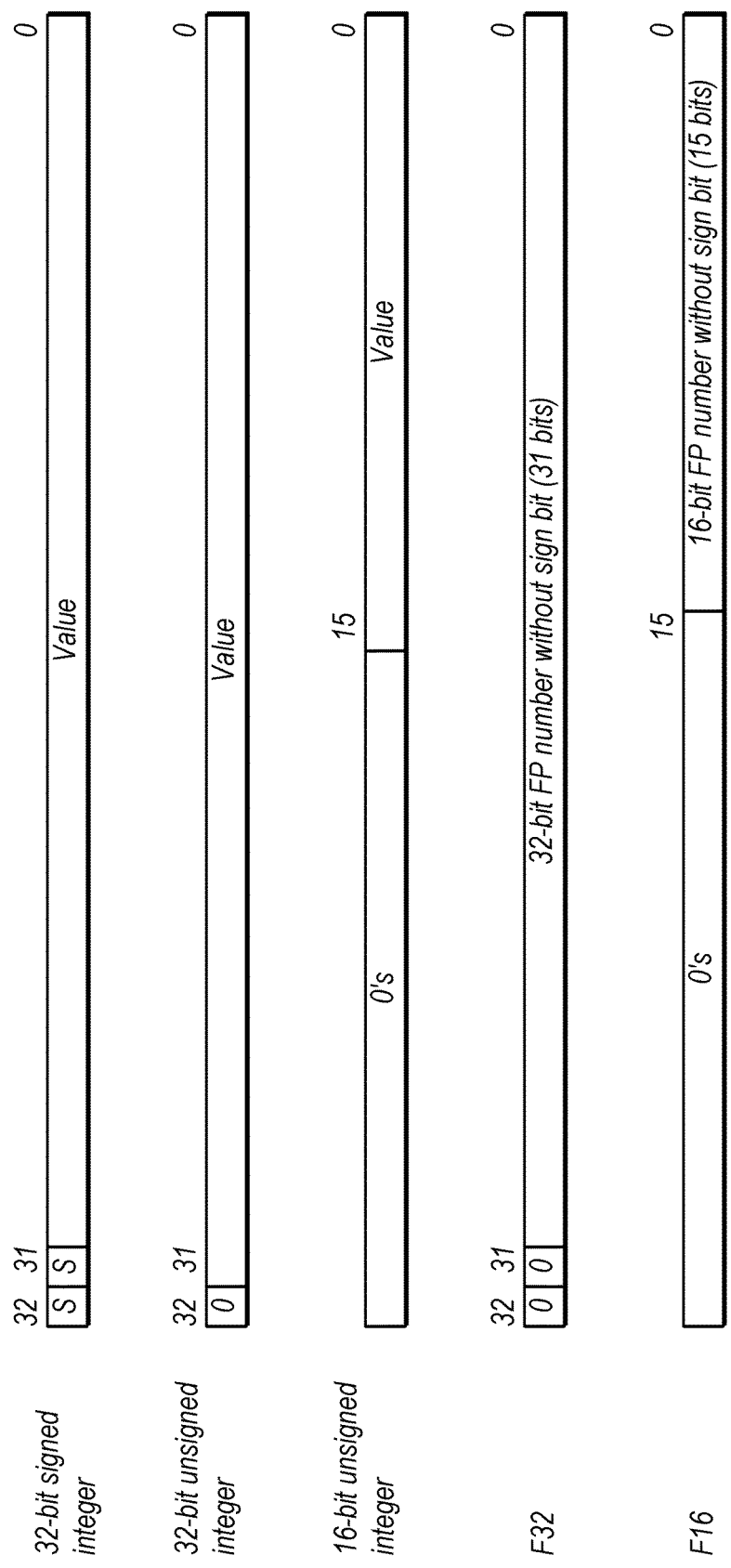
FIG. 3 illustrates exemplary padding of comparison inputs, according to some embodiments.
Figure 4:
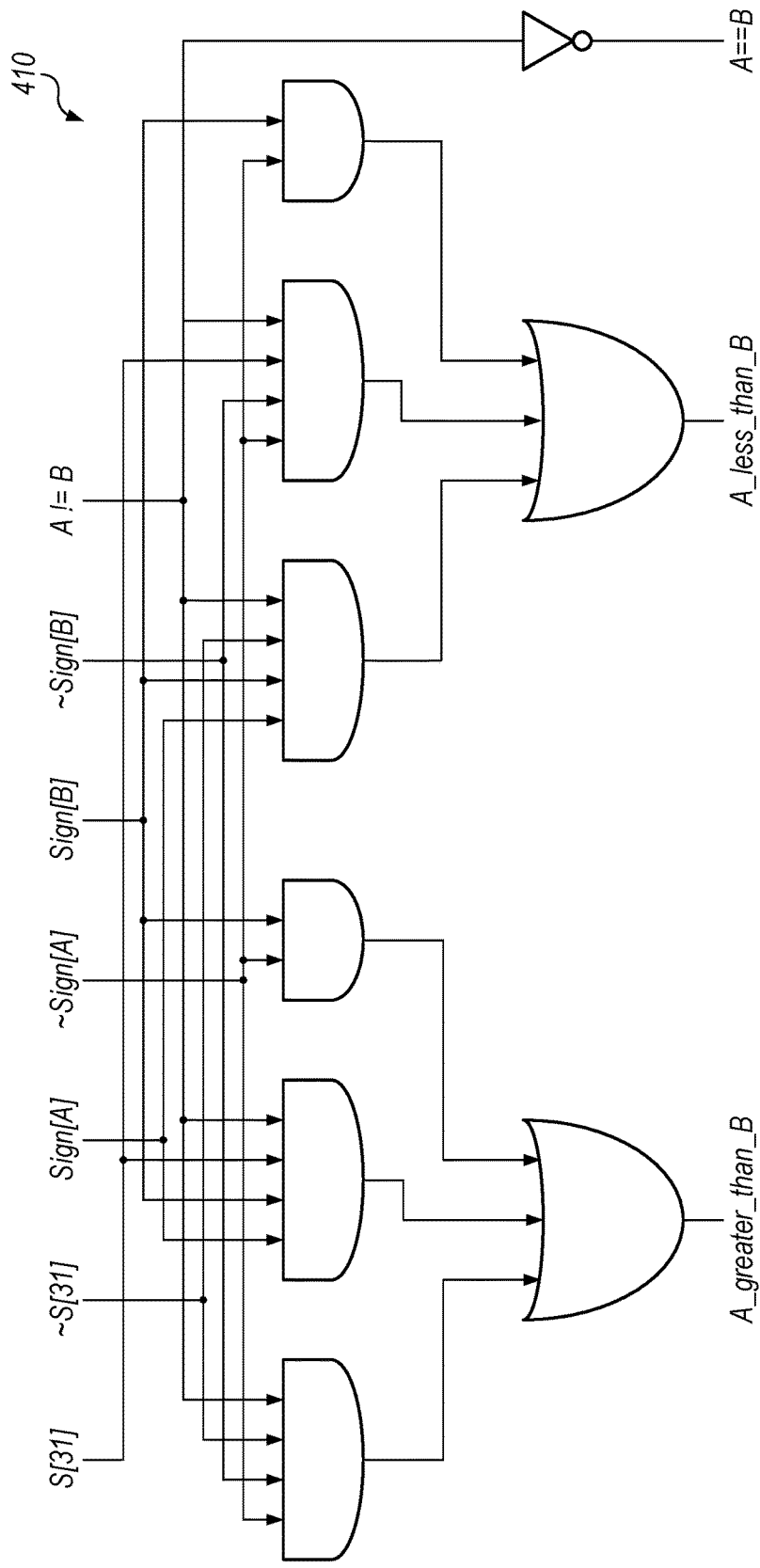
FIG. 4 illustrates exemplary logic for generating a floating-point comparison based on a subtraction result, according to some embodiments.
Figure 5:
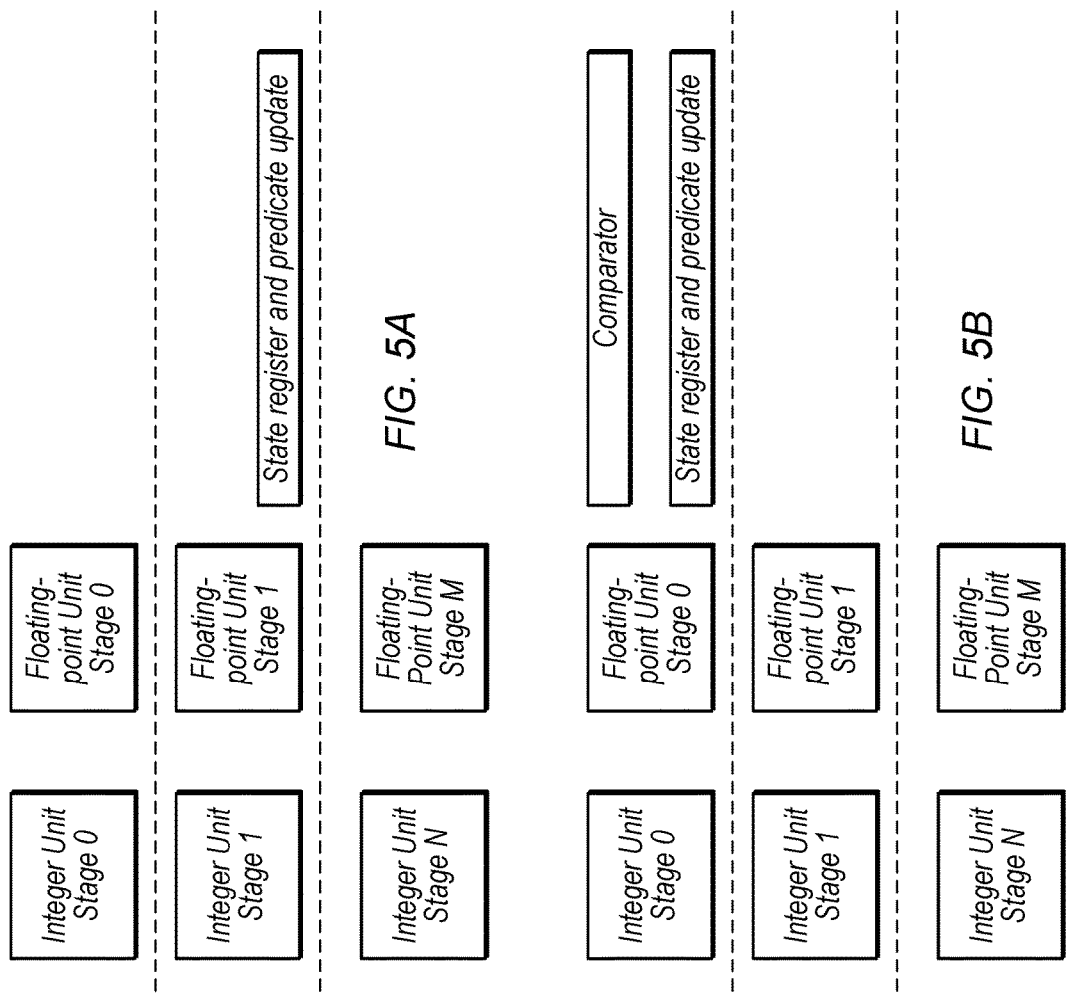
FIGS. 5A-5B are diagrams illustrating exemplary pipeline circuitry, according to some embodiments.
Figure 6:
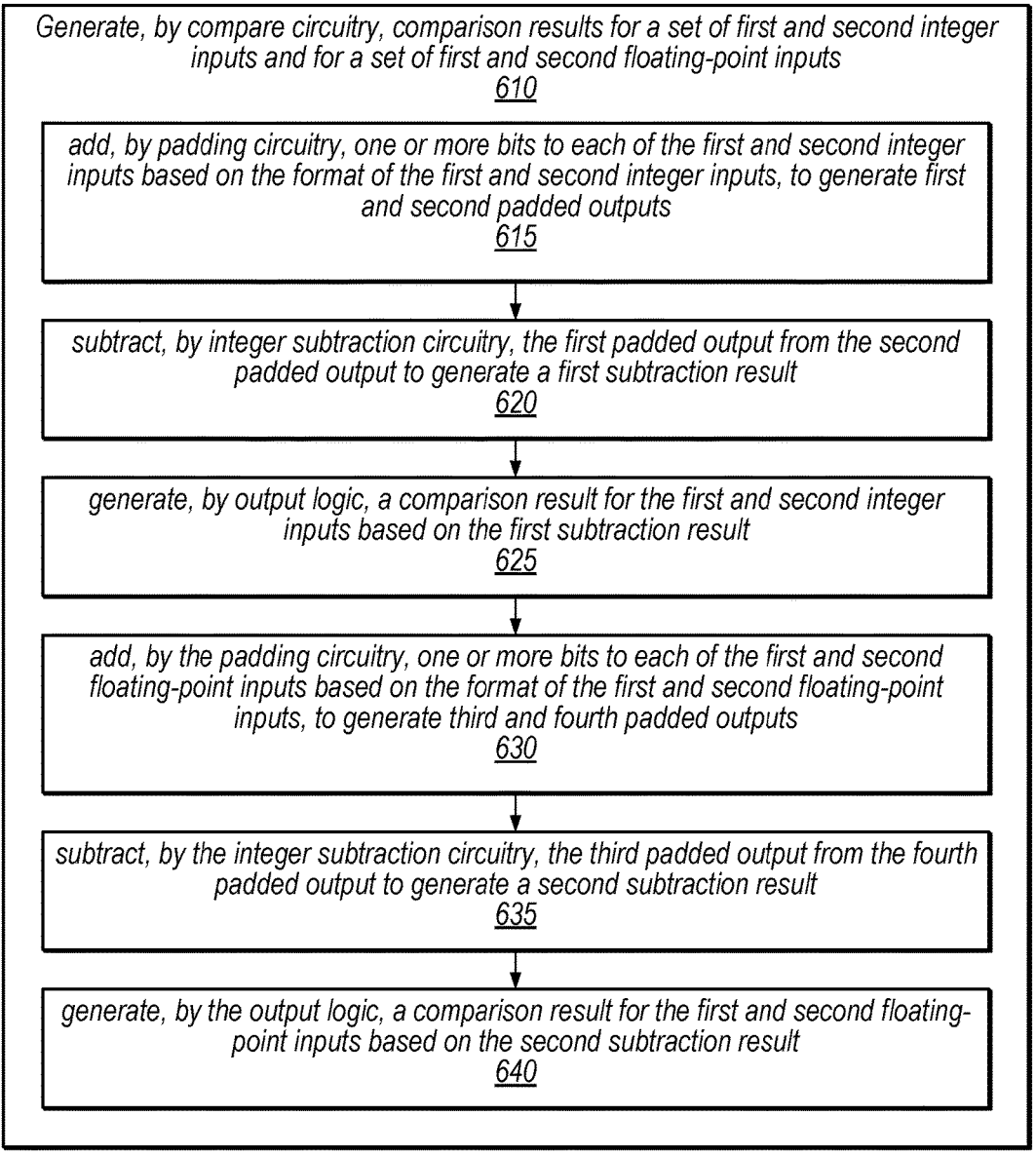
FIG. 6 is a flow diagram illustrating an exemplary method for performing comparison operations of both integer and floating-point inputs, according to some embodiments.
Figure 7:
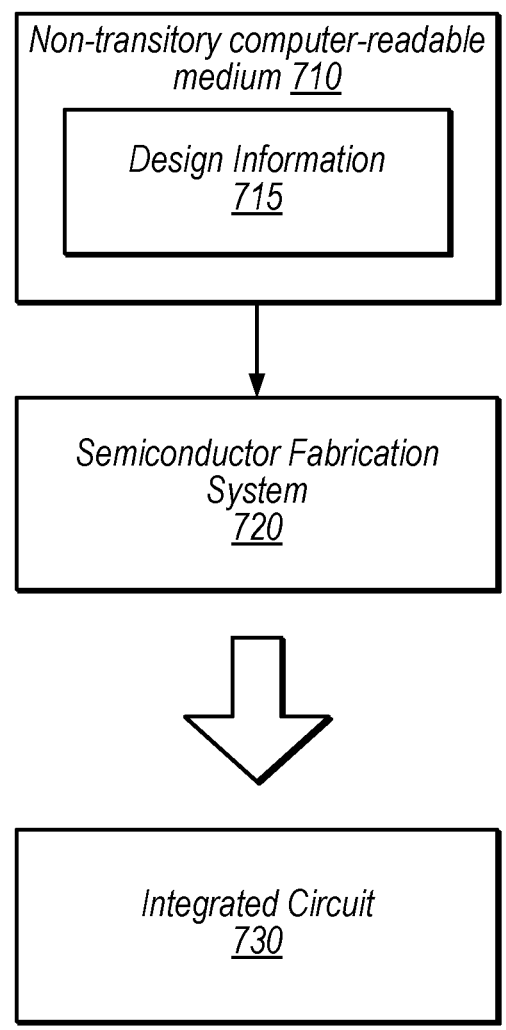
FIG. 7 is a block diagram illustrating an exemplary computer-readable medium that stores design information for fabricating an integrated circuit, according to some embodiments.
Figure 8:
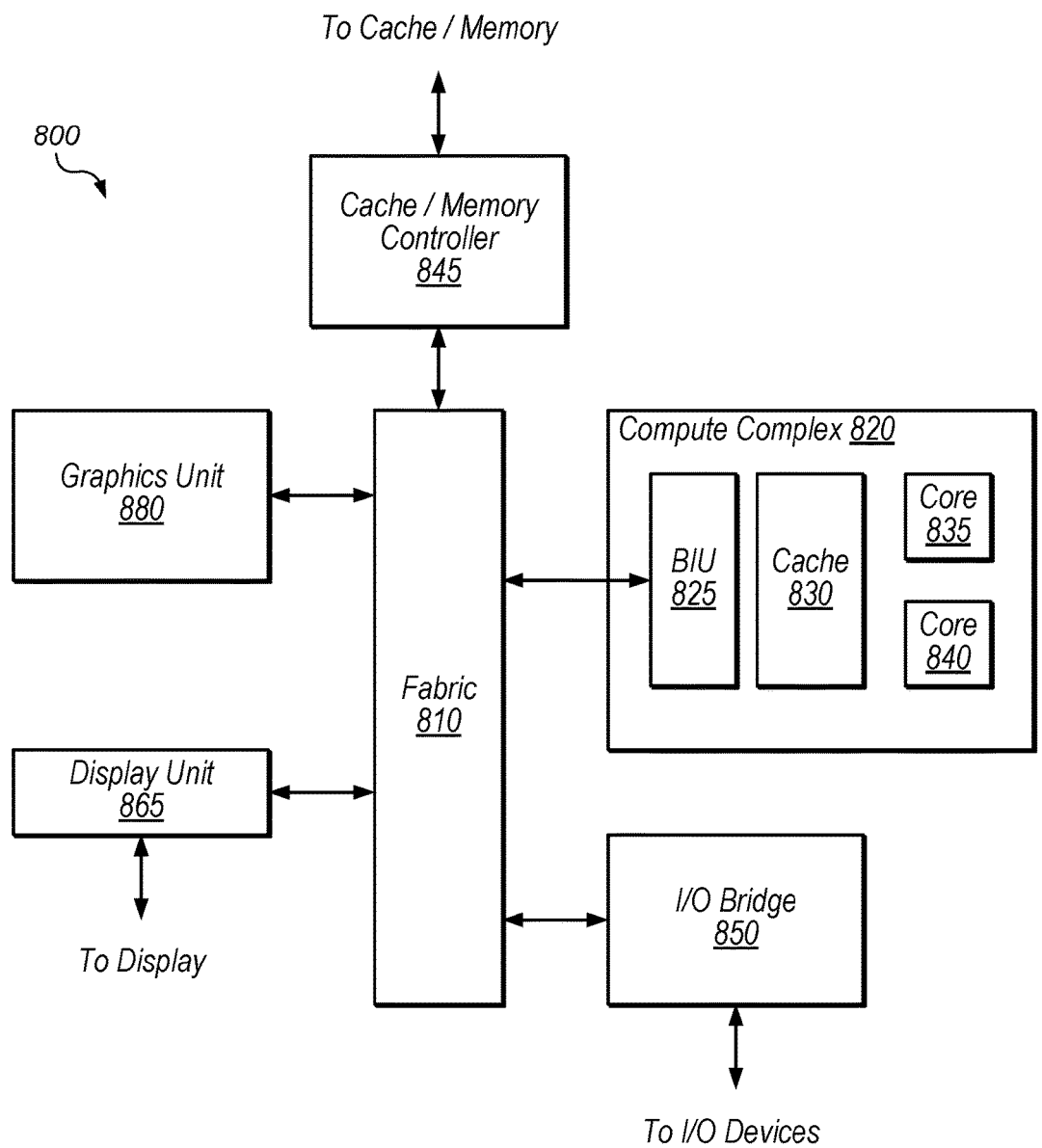
FIG. 8 is a block diagram illustrating an exemplary device, according to some embodiments.

This disclosure initially describes, with reference to FIGS. 1 and 2, exemplary embodiments of a compare unit configure to compare both integer and floating-point inputs. FIG. 3 illustrates exemplary padding techniques for different input formats. FIG. 4 illustrates exemplary logic for generating a floating-point comparison result based on the output of an integer subtractor that is shared for integer comparisons. FIGS. 5A-5B illustrate exemplary pipelines. FIG. 6 illustrates an exemplary method, FIG. 7 illustrates exemplary circuit fabrication, and FIG. 8 illustrates an exemplary device. In some embodiments, the disclosed techniques may improve performance, reduce power consumption, and/or reduce required circuit area.

Exemplary Unified Compare Unit

FIG. 1 is a block diagram illustrating exemplary compare circuitry 110, according to some embodiments. In the illustrated embodiment, compare circuitry 110 is configured to compare inputs A and B and indicate which is greater (or if the two values are the same) using result 115. In some embodiments, result 115 includes multiple bits of information. For example, result 115 may indicate one of: A is greater than B, A is equal to B, A is smaller than B, or some set that the previous options (e.g., a particular bit may indicate that A is greater than or equal to B). Result 115 may be encoded using any of various appropriate encodings. In some embodiments, compare circuitry 110 is configured to compare either two floating-point inputs or two integer inputs. In some embodiments, compare circuitry 110 is "unified" in that at least a portion of compare circuitry 110 is used for both formats. This may reduce circuit area relative to using separate compare units for floating-point and integer operations. In some embodiments, compare circuitry 110 supports multiple integer formats and/or multiple floating-point formats.

FIG. 2 is a more detailed block diagram illustrating exemplary compare circuitry 110, according to some embodiments. In the illustrated embodiment, compare circuitry 110 includes padding circuitry 120, subtractor 130, floating-point (FP) output logic 140, multiplexer (MUX) 145, and integer output logic 150.

Padding circuitry 120, in some embodiments, is configured to add bits to the most-significant portion of inputs to generate padded values that have a greater number of bits than the inputs. In some embodiments, the values of the padded bits are based on the formats of the inputs. In some embodiments, padding circuitry 120 is also configured to replace bits in input values of certain formats (for example, the sign bit of floating-point values may be replaced with a zero). The padding may allow the same subtractor 130 to be used for various different input formats. More detailed exemplary embodiments of padding circuitry 120 are discussed below with reference to FIG. 3. Padding circuitry 120 may include one or more multiplexers that are controlled based on the format of the inputs to set particular bit positions in the padded results. These multiplexers and their corresponding structural equivalents may be referred to as means for adding one or more bits to each of first and second integer inputs based on the format of the first and second integer inputs, to generate first and second padded outputs.

Subtractor 130, in the illustrated embodiment, is configured to subtract one padded value (e.g., padded input B) from the other padded value (e.g., padded input A). In some embodiments, subtractor 130 is an integer subtractor. Subtractor 130 may be implemented using any of various current or future adder/subtractor designs. For example, subtractor 130 may be implemented as an adder with one input negated. Therefore, subtractor 130 may utilize any of various techniques such as hybrid ripple carry, carry lookahead, etc. Any particular types of subtractors herein are discussed for illustrative purposes and are not intended to limit the scope of the present disclosure. In some embodiments, control circuitry (not explicitly shown) is configured to provide control signals to subtractor 130 based on the format of the inputs.

In some embodiments, subtractor 130 is used for both integer and floating-point input values. Thus, the actual subtraction generated for floating-point values will typically not be numerically accurate (e.g., because an integer subtractor does not distinguish between exponent and mantissa bits of a floating-point number). In some embodiments, however, the integer subtraction of padded floating-point inputs provides enough information for FP output logic 140 to determine which of two input floating-point numbers is greater. Subtractor 130 and its corresponding structural equivalents may be referred to as means for subtracting a first padded output from a second padded output to generate a subtraction result.

FP output logic 140, in the illustrated embodiment, is configured to generate a comparison result for floating-point inputs based on at least a portion of the output of subtractor 130. In some embodiments, FP output logic 140 is also configured to consider additional information such as the sign of the input floating-point numbers. In some embodiments, FP output logic 140 is not powered during processing of integer inputs. More detailed embodiments of FP output logic 140 are discussed below with reference to FIG. 4. FP output logic 140 and its corresponding structural equivalents may be referred to as means for generating a comparison result based on a subtraction result.

MUX 145, in the illustrated embodiment, is configured to select either the result from FP output logic 140 or a result from integer output logic 150 based on the format of the inputs (e.g., based on whether they are integer or floating-point inputs).

Integer output logic 150, in the illustrated embodiment, is configured to generate a comparison result for integer inputs based on at least a portion of the output of subtractor 130. In some embodiments, integer output logic 150 is configured to indicate which input is greater based on whether the output of subtractor 130 is positive (e.g., if A minus B is greater than zero then A is greater than B and if A minus B is smaller than zero then A is smaller than B). In some embodiments, integer output logic 150 is configured to detect that the inputs are equal if the output of subtractor 130 is zero. In these embodiments, integer output logic 150 may include a zeros detector. One exemplary implementation of a zeros detector includes a tree of OR gates configured to perform a logical OR on the bits of the output of subtractor 130. In some embodiments, integer output logic 150 is not powered during processing of floating-point inputs. The gates discussed above as exemplary implementations of integer output logic 140, and their corresponding structural equivalents, may be referred to as means for generating a comparison result based on a subtraction result.

Exemplary Padding Techniques

FIG. 3 is a diagram illustrating exemplary padding of different integer and floating-point input formats, according to some embodiments. In the illustrated embodiment, for a 32-bit unsigned integer format, padding circuitry 120 is configured to sign-extend the inputs by one bit to generate a 33-bit padded output value. In the illustrated embodiment, for a 32-bit unsigned integer format, padding circuitry 120 is configured to zero-pad the inputs by one bit to generate a 33-bit padded output value.

For a 16-bit unsigned integer format, in the illustrated embodiment, padding circuitry 120 is configured to zero-pad the inputs by 17 bits to generate a 33-bit padded output value. Note that, in the illustrated embodiment, each padded output value for the various different formats is 33-bits, which is the width of inputs to subtractor 130 in this embodiment.

In other embodiments, compare circuitry 110 may include separate subtractors for different input widths. For example, compare circuitry 110 may include one subtractor for 16-bit inputs, one subtractor for 32-bit inputs, etc. Each of the subtractors may be shared for both integer and floating-point inputs in these embodiments. In still other embodiments, compare circuitry 110 may be configured to accept integer and floating-point inputs having a single fixed number of bits (e.g., compare circuitry 110 may be a 32-bit compare unit only or a 62-bit compare unit only).

For a 32-bit floating point format (F32), in the illustrated embodiment, padding circuitry 120 is configured to replace the sign bit with a zero and zero-pad the result to 33 bits. For a 16-bit floating point format (F16), in the illustrated embodiment, padding circuitry 120 is configured to replace the sign bit with a zero and zero-pad the result to 33 bits.

The illustrated padding techniques, numbers of bits, formats, etc. are shown for purposes of explanation and not intended to limit the scope of the present disclosure. In various embodiments, any of various similar padding techniques may allow the same subtractor to be used for floating-point and integer formats. In some embodiments, compare circuitry 110 is configured to compare input formats having one or more of any of various numbers of bits (e.g., 8-bit values, 64-bit values, etc.). The particular input widths in the illustrated embodiments are shown for exemplary purposes but are not intended to limit the scope of the present disclosure. Further, in some embodiments, compare circuitry 110 is configured to compare inputs of different floating-point formats having the same numbers of bits. For example, in one operation compare circuitry 110 may compare two 32-bit floating-point numbers of a first format (e.g., an IEEE format) and in a second operation compare circuitry 110 may compare two 32-bit floating-point numbers of a second format (e.g., a non-IEEE format).

Although integer and floating-point formats are discussed herein, still other formats or encodings may be compared using the subtractor 130 in some embodiments. Similar techniques may be used for various formats with monotonic mantissa and exponent (if present) encodings. For example, binary-coded decimal (BCD) formats typically encode numbers using four bits for each digit (with six unused values because there are sixteen representable values using four bits but only ten digits). In some embodiments, compare circuitry 110 is configured to compare two BCD inputs using padding circuitry 120 and subtractor 130. In other embodiments, compare circuitry 110 is configured to compare inputs sets that have different formats, implemented using any of various appropriate encodings.

Exemplary Integer Logic

After subtractor 130 has subtracted padded integer inputs, integer output logic 150, in some embodiments, is configured to generate an integer comparison result based on bits of the subtraction result. In some embodiments, for subtractor operation A minus B, and subtractor output S[32:0], A is greater than or equal to B if S[32] is zero and A is smaller than B if S[32] is 1. In some embodiments, integer output logic 150 is also configured to detect whether A and B are equal. For example, integer output logic 150 may OR the bits of the subtraction output to determine whether the output is zero, which would indicate that A and B are the same. As another example, integer output logic 150 may XOR the bits of A and B and OR the result to determine if any bits of A and B are different.

In some embodiments, integer output logic 150 is configured to output a signal A_equals_B if it determines that the inputs are the same. In some embodiments, integer output logic 150 is configured to output a signal A_greater_than_B if S[32] is zero and A_equals_B is zero. In some embodiments, integer output logic 150 is configured to output a signal A_less_than_B if S[32] is one and A_equals_B is zero. In other embodiments, any of various appropriate output encodings may be used to indicate whether A is greater than, less than, and/or equal to B. In various embodiments, integer output logic 150 includes hardware circuitry configured to generate such encodings. Further, integer output logic may use any of various appropriate combinations of hardware logic gates to implement the logical relationships herein.

Exemplary Floating-Point Logic

After subtractor 130 has subtracted padded floating-point inputs, FP output logic 140, in some embodiments, is configured to generate an integer comparison result based on bits of the subtraction result and sign bits of the inputs.

FIG. 4 illustrates an exemplary implementation of FP output logic 140, according to some embodiments. In the illustrated embodiment, the inputs includes: a bit of the subtraction result (S[31] in this particular example), the sign bits of the inputs, and a signal that indicates whether A and B are equal. The particular hardware logic gates of FIG. 4 are shown for purposes of illustration but are not intended to limit the scope of the present disclosure. In other embodiments, any of various appropriate circuitry may be used to implement the logical relationships disclosed herein.

In the illustrated embodiment, six AND gates and two OR gates are used to implement the following equations:

$$A\_greater\_than\_B = \sim Sign[A]\&\sim Sign[B]\&\sim S[31]\& \\ (A!=B)|Sign[A]\&Sign[B]\&S[31]\&(A!=B)|\sim Sign \\ [A]\&Sign[B] \quad (1)$$

$$A\_less\_than\_B = Sign[A]\&Sign[B]\&\sim S[31]\&(A!=B) \\ |\sim Sign[A]\&Sign[B]\&S[31]\&(A!=B)|Sign[A] \\ \&\sim Sign[B] \quad (2)$$

These equations generate an accurate comparison result because, for example, for two floating point numbers with a positive sign, a bigger exponent value will always indicate a larger numeric value. Even though integer subtraction of floating-point numbers does not give an accurate arithmetic result, it does allow determination of which number is larger or smaller, depending on the sign. The equations may be valid even without adding a hidden floating-point bit back into the value because it is assumed to be 1 for normal numbers and zero for denormal numbers, and the exponent field of common floating-point formats already conveys this information. In these embodiments, A==B is true when −0.0 to +0.0.

In some embodiments, FP output logic 140 is also configured to handle values such as not a number (NaN). In some embodiments in which the IEEE 754-2008 format is used, for example, the comparison result is FALSE when one or both of the inputs is NaN. In some embodiments, FP output logic 140 is configured to treat NaN as greater than positive infinity or less than negative infinity (e.g., for compare less-than and compare greater-than instructions respectively), e.g., based on detecting a particular opcode.

Exemplary Instruction Set Architecture (ISA) Implementation

The following discussion explains opcodes for different comparison operations for an exemplary ISA based on a unified comparator and hardware logic for implementing the different operations. In some embodiments, these operations are performed within a single pipeline stage. In some embodiments, for 32-bit comparison implementations, eleven logic levels are sufficient to perform the disclosed techniques.

In some embodiments, the following compare operators are defined for floating-point values, and are delineated using three bits:
3'b000 eq compare equal-to
3'b001 lt compare less-than
3'b010 gt compare greater-than
3'b011 min compare less-than, ±NaN treated as greater-than positive infinity
3'b100 ne compare not-equal-to
3'b101 ge compare greater-than or equal-to
3'b110 le compare less-than or equal-to
3'b111 max compare greater-than, ±NaN treated as less-than negative infinity In some embodiments, the following compare operators are defined for integer values, and are delineated using three bits:
3'b000 ueq unsigned compare equal-to
3'b001 ult unsigned compare less-than
3'b010 ugt unsigned compare greater-than
3'b100 seq signed compare equal-to
3'b101 slt signed compare less-than
3'b110 sgt signed compare greater-than In other embodiments, any of various encodings may be used. The exemplary ISA is discussed for purposes of illustration but is not intended to limit the scope of the present disclosure. In some embodiments, the following logic is used to generate control signals based on the specified operator:

$$\text{sel\_gt}=(\text{cmpOp}[2:0]==3'b010)|(\text{cmpOp}[2:0]==3'b110)|(\text{cmpOp}[2:0]==3'b111) \qquad (3)$$

$$\text{sel\_lt}=(\text{cmpOp}[2:0]==3'b001)|(\text{cmpOp}[2:0]==3'b101)|(\text{cmpOp}[2:0]==3'b011) \qquad (4)$$

$$\text{sel\_eq}=(\text{cmpOp}[2:0]==3'b000)|(\text{cmpOp}[2:0]==3'b100) \qquad (5)$$

$$\text{A\_compare\_minmax\_with\_BisNaN}=((\text{cmpOp}[2:0]==3'b011)|(\text{cmpOp}[2:0]==3'b111))\&(B==\text{NaN}) \qquad (6)$$

$$\text{polarity\_inversion}=(\text{cmpOp}[2:0]==3'b100)|(\text{cmpOp}[2:0]==3'b101)|(\text{cmpOp}[2:0]==3'b110) \qquad (7)$$

The left-hand sides of equations (3)-(7), in these embodiments, are control signals that indicate what type of operation is being performed, how NaN values should be handled, and whether the comparison result is negated.

Based on these control signals, the following logic is used to generate results in some embodiments:

$$\text{AGtB}=(A!=\text{NaN})\&(B!=\text{NaN})\&\text{sel\_gt}\&(A\_Gt\_B\&\sim\text{polarity\_inversion}(A\_Lt\_B|A\_Eq\_B)\&\text{polarity\_inversion}) \qquad (8)$$

$$\text{ALtB}=(A!=\text{NaN})\&(B!=\text{NaN})\&\text{sel\_lt}\&(A\_Lt\_B\&\sim\text{polarity\_inversion}(A\_Gt\_B|A\_Eq\_B)\&\text{polarity\_inversion}) \qquad (9)$$

$$\text{AEqB}=(A!=\text{NaN})\&(B!=\text{NaN})\&\text{sel\_eq}\&(A\_Eq\_B\,\hat{}\,\text{polarity\_inversion}) \qquad (10)$$

For select operations, in some embodiments, where the comparison of operands A and B is used to select an operand C or D, the following logic is used:

$$\text{select}=(\text{AGtB}|\text{ALtB}|\text{AEqB}|\text{A\_compare\_minmax\_with\_BisNaN}) \qquad (11)$$

$$\text{cnd\_result}=\text{Negation}\,\hat{}\,\text{select} \qquad (12)$$

$$\text{select\_result}[31:0]=\text{select}?\text{operandC}[31:0]:\text{operandD}[31:0]; \qquad (13)$$

As discussed above, the logic to implement equations 3-13 may be implemented within a single pipeline stage because of the relatively small number of logic levels needed for the hardware circuitry. In some embodiments, the Negation signal is a bit defined by the ISA that allows control of whether to invert the compare result.

In some embodiments, the comparison results are used to control predicated execution by updating a state register and predicate result based on the value of cnd_result. Branch predication is a technique that allows each instruction to conditionally either perform an operation or do nothing. This involves coding all possible branch paths inline, but some instructions execute while others do not, based on predication conditions. The disclosed techniques may be used for traditional conditional branching operations and/or for determining whether conditional instructions should be executed for predicated execution, among other determinations.

Exemplary Pipeline

FIG. 5A is a block diagram illustrating an exemplary pipeline in which comparison operations are performed by an execution unit. In the illustrated embodiment, integer unit stage 1 or floating-point unit stage 1 is configured to generate a comparison result in the second clock cycle, which allows state register and predicate update for predicated execution in this cycle.

FIG. 5B is a block diagram illustrating an exemplary pipeline in which comparison operations are performed by a dedicated comparator, according to some embodiments (e.g., by compare circuitry 110). In the illustrated embodiment, the comparator is configured to generate a comparison result in a single stage, allowing stage register and predicate update to occur in the same cycle (in embodiments in which branch predication is implemented). The illustrated pipeline stages and number of cycles are not intended to limit the scope of the present disclosure. In various embodiments, however, the disclosed techniques may allow comparison results to be generated using a smaller number of clock cycles relative to using respective general-purpose integer and floating-point execution units to generate comparison results.

Exemplary Method

FIG. 6 is a flow diagram illustrating a method 600 for performing floating-point operations, according to some embodiments. The method shown in FIG. 6 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired.

At 610, in the illustrated embodiment, compare circuitry 110 generates comparison results for a set of first and second integer inputs and for a set of first and second floating-point inputs. In some embodiments, the integer inputs are for a first comparison operation (e.g., as specified by one instruction) and the floating-point inputs are for a second comparison operation (e.g., as specified by another instruction). In some embodiments, compare circuitry 110 is configured to use at least a portion of its circuitry (e.g., an integer subtractor) for both the integer comparison and the floating-point comparison. In the illustrated embodiment, generating the comparison results includes method elements 615-640.

At 615, in the illustrated embodiment, padding circuitry 120 adds one or more bits to each of the first and second integer inputs based on the format of the first and second integer inputs, to generate first and second padded outputs with a greater number of bits than the inputs. In some embodiments, if the integer inputs are unsigned, then padding circuitry 120 zero-pads the input values. In some embodiments, if the integer inputs are signed, then padding circuitry 120 sign extends the input values. The padding may be a single bit for some precisions or may be multiple bits for other precisions.

At 620, in the illustrated embodiment, subtractor 130 subtracts the first padded output from the second padded output.

At 625, in the illustrated embodiment, integer output logic 150 generates a comparison result for the first and second integer inputs based on the first subtraction result. In some embodiments, integer output logic generates the result based on the sign bit of the subtraction result (e.g., the most significant bit). In some embodiments, integer output logic also generates the result based on a determination whether the first and second padded values are equal, which may be determined using zeros detector circuitry that receives a result of the subtraction, for example. In some embodiments, method element 625 completes a comparison of the integer inputs.

At 630, in the illustrated embodiment, padding circuitry 120 adds one or more bits to each of the first and second floating-point inputs based on the format of the first and second floating-point inputs, to generate third and fourth padded outputs. In some embodiments, the padding is a zero-padding of one or more bits. In some embodiments, padding circuitry 120 also replaces the sign bits of the floating-point inputs with zeros. In some embodiments, padding circuitry 120 determines the format of inputs based on received control signaling, which may be based on the opcode of an instruction that specifies the comparison, for example.

At 635, in the illustrated embodiment, subtractor 130 subtracts the third padded output from the fourth padded output to generate a second subtraction result. In the illustrated embodiment, this is an integer subtraction. Thus, in various embodiments, subtractor 130 uses the same circuitry to perform method elements 620 and 635. Using the same circuitry for floating-point and integer inputs may substantially reduce chip area, in some embodiments.

At 640, in the illustrated embodiment, FP output logic 140 generates a comparison result for the first and second floating-point inputs based on the second subtraction result. Note that FP output logic 140 and integer output logic 150 are collectively referred to as "output logic" in the illustration of FIG. 6. These logic circuits may make up different portions of the same unit or may be considered separate units, in various embodiments. In some embodiments, FP output logic 140 and integer output logic 150 share at least a portion of the same circuitry. For example, the same circuitry is configured to determine whether inputs are equal for both floating-point and integer inputs, in some embodiments.

Exemplary Storage Medium

FIG. 7 is a block diagram illustrating an exemplary non-transitory computer-readable storage medium that stores circuit design information, according to some embodiments. In the illustrated embodiment semiconductor fabrication system 720 is configured to process the design information 715 stored on non-transitory computer-readable medium 710 and fabricate integrated circuit 730 based on the design information 715.

Non-transitory computer-readable medium 710, may comprise any of various appropriate types of memory devices or storage devices. Medium 710 may be an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. Medium 710 may include other types of non-transitory memory as well or combinations thereof. Medium 710 may include two or more memory mediums which may reside in different locations, e.g., in different computer systems that are connected over a network.

Design information 715 may be specified using any of various appropriate computer languages, including hardware description languages such as, without limitation: VHDL, Verilog, SystemC, SystemVerilog, RHDL, M, MyHDL, etc. Design information 715 may be usable by semiconductor fabrication system 720 to fabrication at least a portion of integrated circuit 730. The format of design information 715 may be recognized by at least one semiconductor fabrication system 720. In some embodiments, design information 715 may also include one or more cell libraries which specify the synthesis and/or layout of integrated circuit 730.

Semiconductor fabrication system 720 may include any of various appropriate elements configured to fabricate integrated circuits. This may include, for example, elements for depositing semiconductor materials (e.g., on a wafer, which may include masking), removing materials, altering the shape of deposited materials, modifying materials (e.g., by doping materials or modifying dielectric constants using ultraviolet processing), etc. Semiconductor fabrication system 720 may also be configured to perform various testing of fabricated circuits for correct operation.

In various embodiments, integrated circuit 730 is configured to operate according to a circuit design specified by design information 715, which may include performing any of the functionality described herein. For example, integrated circuit 730 may include any of various elements discussed herein or shown in FIGS. 1-2, 4, 5A-5B, and/or 8. Further, integrated circuit 730 may be configured to perform various functions described herein in conjunction with other components. For example, integrated circuit 730 may be coupled to voltage supply circuitry that is configured to provide a supply voltage (e.g., as opposed to including a voltage supply itself). Further, the functionality described herein may be performed by multiple connected integrated circuits.

As used herein, a phrase of the form "design information that specifies a design of a circuit configured to . . . " does not imply that the circuit in question must be fabricated in order for the element to be met. Rather, this phrase indicates that the design information describes a circuit that, upon being fabricated, will be configured to perform the indicated actions or will include the specified components.

Exemplary Device

Referring now to FIG. 8, a block diagram illustrating an exemplary embodiment of a device 800 is shown. In some embodiments, elements of device 800 may be included within a system on a chip. In some embodiments, device 800 may be included in a mobile device, which may be battery-powered. Therefore, power consumption by device 800 may be an important design consideration. In the illustrated embodiment, device 800 includes fabric 810, compute complex 820, input/output (I/O) bridge 850, cache/memory controller 845, graphics unit 850, and display unit 865.

Fabric 810 may include various interconnects, buses, MUX's, controllers, etc., and may be configured to facilitate communication between various elements of device 800. In some embodiments, portions of fabric 810 may be configured to implement various different communication protocols. In other embodiments, fabric 810 may implement a single communication protocol and elements coupled to fabric 810 may convert from the single communication protocol to other communication protocols internally.

In the illustrated embodiment, compute complex 820 includes bus interface unit (BIU) 825, cache 830, and cores 835 and 840. In various embodiments, compute complex 820 may include various numbers of processors, processor cores and/or caches. For example, compute complex 820 may include 1, 2, or 4 processor cores, or any other suitable number. In one embodiment, cache 830 is a set associative L2 cache. In some embodiments, cores 835 and/or 840 may include internal instruction and/or data caches. In some embodiments, a coherency unit (not shown) in fabric 810, cache 830, or elsewhere in device 800 may be configured to maintain coherency between various caches of device 800. BIU 825 may be configured to manage communication between compute complex 820 and other elements of device 800. Processor cores such as cores 835 and 840 may be configured to execute instructions of a particular instruction set architecture (ISA) which may include operating system instructions and user application instructions.

Cache/memory controller 845 may be configured to manage transfer of data between fabric 810 and one or more caches and/or memories. For example, cache/memory controller 845 may be coupled to an L3 cache, which may in turn be coupled to a system memory. In other embodiments, cache/memory controller 845 may be directly coupled to a memory. In some embodiments, cache/memory controller 845 may include one or more internal caches.

As used herein, the term "coupled to" may indicate one or more connections between elements, and a coupling may include intervening elements. For example, in FIG. 8, graphics unit 850 may be described as "coupled to" a memory through fabric 810 and cache/memory controller 845. In contrast, in the illustrated embodiment of FIG. 8, graphics unit 850 is "directly coupled" to fabric 810 because there are no intervening elements.

Graphics unit 880 may include one or more processors and/or one or more graphics processing units (GPU's). Graphics unit 880 may receive graphics-oriented instructions, such as OPENGL®, Metal, or DIRECT3D® instructions, for example. Graphics unit 880 may execute specialized GPU instructions or perform other operations based on the received graphics-oriented instructions. Graphics unit 880 may generally be configured to process large blocks of data in parallel and may build images in a frame buffer for output to a display. Graphics unit 880 may include transform, lighting, triangle, and/or rendering engines in one or more graphics processing pipelines. Graphics unit 880 may output pixel information for display images.

Display unit 865 may be configured to read data from a frame buffer and provide a stream of pixel values for display. Display unit 865 may be configured as a display pipeline in some embodiments. Additionally, display unit 865 may be configured to blend multiple frames to produce an output frame. Further, display unit 865 may include one or more interfaces (e.g., MIPI® or embedded display port (eDP)) for coupling to a user display (e.g., a touchscreen or an external display).

I/O bridge 850 may include various elements configured to implement: universal serial bus (USB) communications, security, audio, and/or low-power always-on functionality, for example. I/O bridge 850 may also include interfaces such as pulse-width modulation (PWM), general-purpose input/output (GPIO), serial peripheral interface (SPI), and/or inter-integrated circuit (I2C), for example. Various types of peripherals and devices may be coupled to device 800 via I/O bridge 850.

The disclosed compare circuitry 110 may be implemented in various elements of device 800. In some embodiments, processor cores 835 and/or 840 include instances of compare circuitry 110, for example. In some embodiments, graphics unit 880 includes a programmable shader with multiple parallel shader pipes and the shader pipes each include an instance of compare circuitry 110. In other embodiments, the disclosed comparison techniques may be implemented in any of various appropriate processing elements. The particular elements discussed with reference to FIG. 8 are for purposes of explanation and are not intended to limit the scope of the present disclosure.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
compare circuitry configured to generate comparison results for sets of inputs in both one or more integer formats and one or more floating-point formats, using circuitry that includes:
   padding circuitry configured to receive first and second input values having a format and to add one or more bits to each of first and second input values to generate first and second padded values respectively having a greater number of bits than the first and second input values, wherein content of the one or more bits is based on the format of the first and second input values;
   integer subtraction circuitry configured to subtract the first padded value from the second padded value to generate a subtraction result; and
   output logic configured to generate the comparison result based on the subtraction result.

2. The apparatus of claim 1, wherein the padding circuitry is configured to replace a sign bit of at least one floating-point format with a zero and zero-pad the resulting value.

3. The apparatus of claim 1, wherein the padding circuitry is configured to sign extend at least one signed integer format.

4. The apparatus of claim 1, wherein the padding circuitry is configured to zero-pad at least one unsigned integer format.

5. The apparatus of claim 1, wherein the output logic includes one or more circuits configured to determine whether the first and second input values have the same value based on whether the subtraction result is zero.

6. The apparatus of claim 1, wherein the output logic is configured to determine whether the first input or the second input is greater for at least one floating-point format based on at least one of: a sign of the first input, a sign of the second input, a particular bit of the subtraction result, or a determination of whether the first and second inputs have the same value.

7. The apparatus of claim 1, wherein the output logic is configured to determine whether the first input or the second input is greater for at least one integer format based on a sign bit of the subtraction result.

8. The apparatus of claim 1, wherein the compare circuitry is configured to generate comparison results for sets of inputs in multiple different integer formats and multiple different floating-point formats.

9. The apparatus of claim 1, wherein the compare circuitry is configured to generate a comparison result for the first and second input values using single pipeline stage.

10. A method, comprising:
generating, by compare circuitry, comparison results for a set of first and second integer inputs and for a set of first and second floating-point inputs, including:
   adding, by padding circuitry, one or more bits to each of the first and second integer inputs based on the format of the first and second integer inputs, to generate first and second padded outputs respectively having a greater number of bits than the first and second integer inputs;
   subtracting, by integer subtraction circuitry, the first padded output from the second padded output to generate a first subtraction result;
   generating, by output logic, a comparison result for the first and second integer inputs based on the first subtraction result;
   adding, by the padding circuitry, one or more bits to each of the first and second floating-point inputs based on the format of the first and second floating-point inputs, to generate third and fourth padded outputs respectively having a greater number of bits than the first and second floating-point inputs;
   subtracting, by the integer subtraction circuitry, the third padded output from the fourth padded output to generate a second subtraction result; and
   generating, by the output logic, a comparison result for the first and second floating-point inputs based on the second subtraction result.

11. The method of claim 10, further comprising replacing, by the padding circuitry, a sign bit of the first floating-point input with a zero and zero-pad the resulting value.

12. The method of claim 10, further comprising determining, by the output logic whether the first floating-point input or the second floating-point input is greater based on at least one of: a sign of the first floating-point input, a sign of the second floating-point input, a particular bit of the second subtraction result, or a determination of whether the first and second floating-point inputs have the same value.

13. The method of claim 10, further comprising determining, by the output logic, whether the first integer input or the second integer input is greater based on a sign bit of the first subtraction result.

14. A non-transitory computer readable storage medium having stored thereon design information that specifies a circuit design in a format recognized by a fabrication system that is configured to use the design information to fabricate a hardware integrated circuit that includes circuitry configured to operate according to the circuit design, wherein the circuitry includes:
compare circuitry configured to generate comparison results for sets of inputs in both one or more integer formats and one or more floating-point formats, using circuitry that includes:
   padding circuitry configured to add one or more bits to each of first and second input values to generate first and second padded values, wherein content of the one or more bits is based on the format of the first and second input values;
   integer subtraction circuitry configured to subtract the first padded value from the second padded value to generate a subtraction result; and
   output logic configured to generate the comparison result based on the subtraction result.

15. The non-transitory computer readable storage medium of claim 14, wherein the padding circuitry is configured to replace a sign bit of at least one floating-point format with a zero and zero-pad the resulting value.

16. The non-transitory computer readable storage medium of claim 14, wherein the output logic includes one or more circuits configured to determine whether the first and second input values have the same value based on whether the subtraction result is zero.

17. The non-transitory computer readable storage medium of claim 16, wherein the output logic is configured to determine whether the first input or the second input is greater for at least one floating-point format based on: a sign of the first input, a sign of the second input, a particular bit of the subtraction result, and a determination of whether the first and second inputs have the same value.

18. The non-transitory computer readable storage medium of claim 14, wherein the output logic is configured to determine whether the first input or the second input is greater for at least one integer format based on a sign bit of the subtraction result.

19. The non-transitory computer readable storage medium of claim 14, wherein the compare circuitry is configured to generate comparison results for sets of inputs in multiple different integer formats and multiple different floating-point formats.

20. The non-transitory computer readable storage medium of claim 14, wherein the compare circuitry is configured to generate a comparison result for the first and second input values using single pipeline stage.

* * * * *